UNITED STATES PATENT OFFICE.

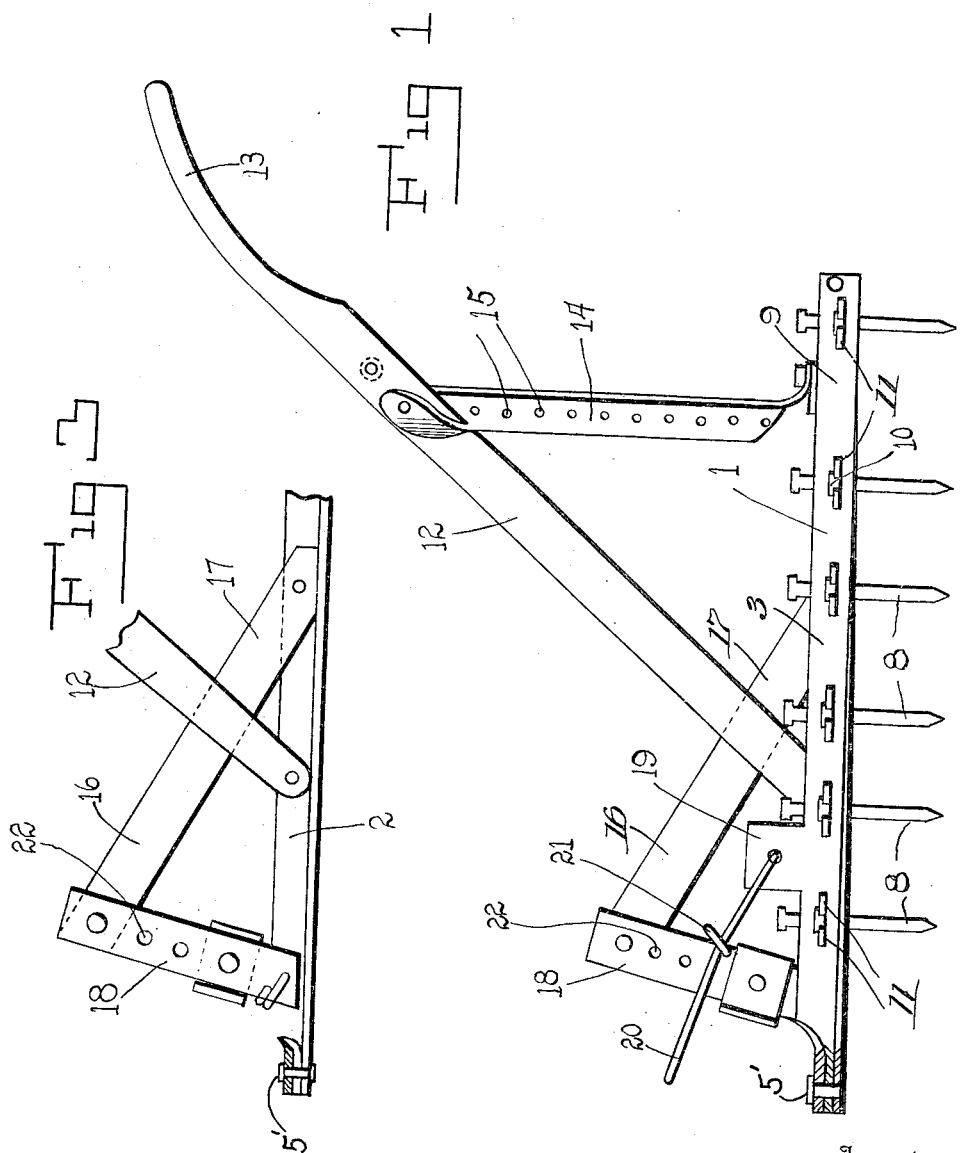

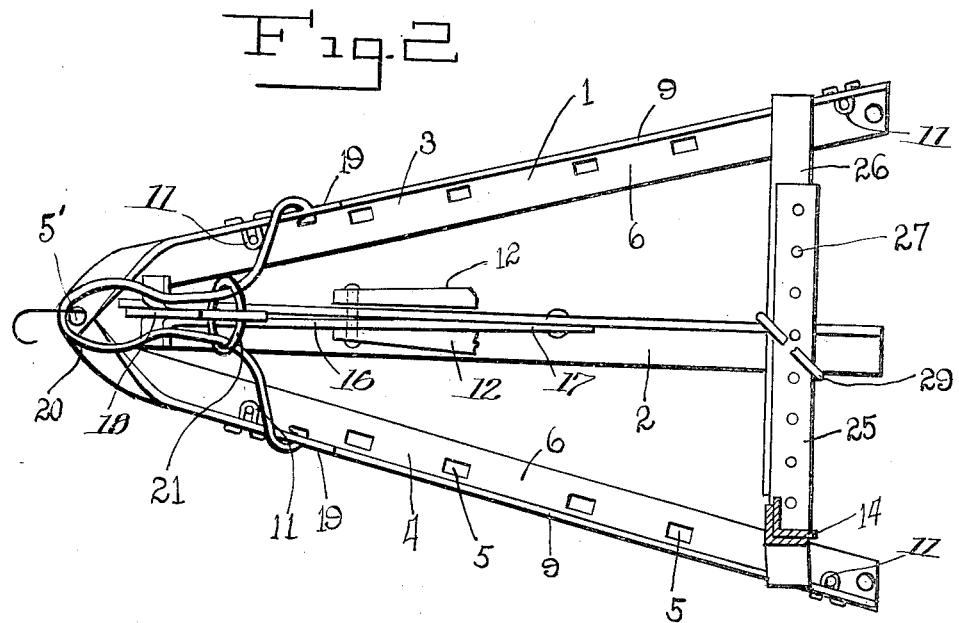
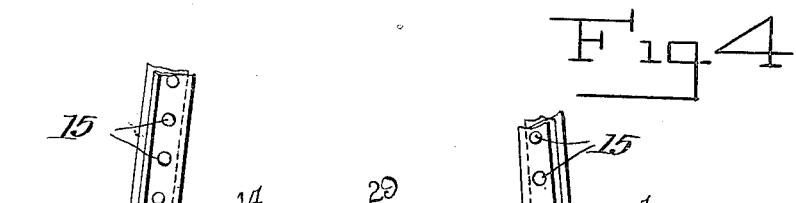
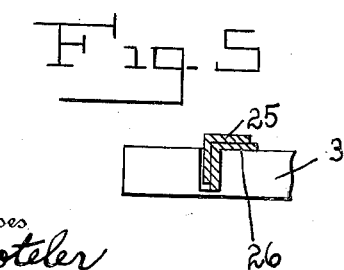
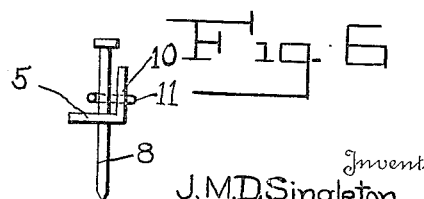

JAMES MACK DUFFIE SINGLETON, OF DUBLIN, GEORGIA.

HARROW.

1,131,566. Specification of Letters Patent. Patented Mar. 9, 1915.

Application filed June 17, 1914. Serial No. 845,650.

*To all whom it may concern:*

Be it known that I, JAMES MACK DUFFIE SINGLETON, a citizen of the United States, residing at Dublin, in the county of Laurens and State of Georgia, have invented certain new and useful Improvements in Harrows; and I do hereby declare the following to be a full, clear, and exact description of the invention, such as will enable others skilled in the art to which it appertains to make and use the same.

This invention relates to harrows, and implements of like construction which are used for pulverizing or preparing the soil preparatory to planting grain therein or after the planting for purposes of cultivation.

The primary object of this invention is the provision of an agricultural implement as specified, which is constructed of a plurality of adjustably formed bars which support harrowing teeth, and which bars have handles adjustably supported thereupon, to provide for the manual manipulation or guidance of the implement.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a side elevation of the improved harrow. Fig. 2 is a top plan view of the harrow. Fig. 3 is a detail side elevation of the hitch for the improved harrow. Fig. 4 is a detail cross sectional view through the improved harrow. Fig. 5 is a detail cross sectional view, showing the manner of overlapping of the adjustable parts of the harrow. Fig. 6 is a detail view, showing the manner of attaching the harrow or cultivating teeth to the supporting frame.

Referring to the drawings, 1 designates the supporting frame of the agricultural implement or harrow as an entirety, which frame is substantially triangular shaped, as illustrated in Fig. 2 of the drawings. The frame 1 has a centrally disposed longitudinally extending brace bar 2, to the forward end of which are pivotally connected side bars 3 and 4. The side bars 3 and 4 are pivotally connected to the central brace bar 2, as is shown at 5', for independent oscillatory movement about their pivotal points, for providing a harrow or agricultural implement which will cultivate a space of ground of greater width, to accommodate the different kinds of rows of growing grain, or to suit other practical conditions which may arise during the use of the implement. The side bars 3 and 4 are formed of angle iron, and they are provided with longitudinally spaced openings 5 in the side 6 forming the base of the side bars. The openings 5 are provided for the reception of the teeth 8 used for the cultivation or preparation of the ground. The sides 9 of the side bars 3 and 4 are also provided with longitudinally spaced openings 10, which openings are in alinement with the openings 5 and are provided for the reception of U shaped resilient gripping members 11, which pass about or encompass substantially three-fourths of the circumference of the harrowing teeth 8, and extend through the various openings 10 having their terminal ends bent substantially at right angles to the shanks thereof and lying in facial abutting engagement with the sides 9 of the side bars 3 and 4, as is clearly shown in Figs. 2 and 6 of the drawings. The U shaped members 11 tend to securely hold the harrowing teeth 8 in their proper positions, and they also permit of the removal of the harrow teeth for the replacing of broken teeth or the like.

The central spacing bar 2 has handles 12 secured thereto, which handles extend upwardly from the frame 1, in the usual manner and have the hand gripping portions 13 formed upon their upper terminal ends. The handles 12 are braced by adjustable braces 14, which are connected to the side bars 3 and 4 adjacent their lower ends, and which adjustable braces are formed of two sections of overlapping angle irons. The overlapping sides of the angle irons of which the brace rods 14 are formed are provided with a plurality of vertically arranged openings 15, which receive pins for holding the handles 12 in various adjusted positions for the accommodation of persons of different heights.

The forward end of the central brace bar 2 has a hitching device 16 secured thereto, which hitching device consists of braces or bars 17, which are secured to the bar 2 rearwardly of the forward end thereof and extend upwardly at an incline from the bar 2, having a second bar 18 secured to its forward end, which bar extends downwardly from the upper end of the bar 17 and is secured in any suitable manner to the bar 2, as is clearly shown in Fig. 3 of the drawings. The side plates 3 and 4 have ears 19 secured thereto rearwardly of the bar 18, and they have pivotally connected thereto a clevis 20, which is bent forwardly from the ears 19 and is substantially U shaped, having its sides disposed about the bar 18, as is clearly shown in Fig. 2 of the drawings. A link 21 is mounted upon the clevis 20 and it has its end seated in any one of the various openings 22, which are formed serially in the plate 18 for holding the clevis 20 at various elevations for regulating the thrust or insertion of the teeth 8 into the ground or for regulating the draft of the harrow to suit practical conditions. The rear end of the side bars 3 and 4 have shaft bars 25 and 26 secured thereto respectively, and formed of angle iron having horizontal sides positioned upwardly and provided with a plurality of longitudinally spaced openings 27, which openings are provided for the reception of the harrow teeth 8. The openings 27 are so arranged, that when the plates 26 and 25 are adjusted for accommodating the distance between the terminal ends of the side bars 3 and 4, they will be held rigidly in place by the harrow teeth 8, which are inserted through coinciding openings 27 formed in the respective plates 25 and 26. A link 29 is positioned above the plates 25 and 26 and also diagonally across the center bar 2, as is clearly shown in Fig. 2 of the drawings, to prevent the oscillatory movement or the dislodgment of the plates with respect to each other and to the shape of the harrow.

In reducing the invention to practice certain novel features of construction, combination and arrangement of parts may necessitate alterations to which the patentee is entitled, provided such alterations are comprehended within the scope of what is claimed.

Having thus described the invention what is claimed as new, is:

1. In a harrow, a pair of harrow teeth carrying bars pivotally connected at their forward ends, and adjustable harrow teeth carrying bars adjustably connecting the free ends of said first named bars.

2. In a harrow, a pair of harrow teeth carrying bars pivotally connected at their forward ends, and adjustable harrow teeth carrying brace bars connected to the rear ends of said first named bars, and a bracing bar disposed intermediate of said first named harrow teeth carrying bars and secured to said adjustable bracing bar.

3. In a harrow, a central bracing bar, a pair of harrow teeth carrying bars pivotally connected to the forward end of said central bracing bar and extending obliquely to the longitudinal lines of said central bar, means for detachably securing harrow teeth to said bars, and adjustable harrow teeth carrying bars for holding said pivoted harrow teeth carrying bars in various adjusted positions.

4. In a harrow, a central bracing bar, a pair of harrow teeth carrying bars pivotally connected to the forward end of said central bracing bar and extending obliquely to the longitudinal lines of said central bar, means for detachably securing harrow teeth to said bars, adjustable harrow teeth carrying bars for holding said pivoted harrow teeth carrying bars in various adjusted positions, handles secured to said central bracing bar, and adjustable supporting bars for said handles secured to said rear harrow teeth carrying bars.

In testimony whereof I affix my signature in presence of two witnesses.

JAMES MACK DUFFIE SINGLETON.

Witnesses:
M. O. GRINSTEAD,
M. A. ROGERS.

Copies of this patent may be obtained for five cents each, by addressing the "Commissioner of Patents, Washington, D. C."